United States Patent [19]

Ferguson

[11] Patent Number: 4,770,731
[45] Date of Patent: Sep. 13, 1988

[54] METHOD OF MAKING A PATCH FOR A SHRINKABLE BAG

[75] Inventor: Daniel J. Ferguson, Spartanburg, S.C.

[73] Assignee: W. R. Grace & Co.-Conn., Duncan, S.C.

[21] Appl. No.: 129,129

[22] Filed: Dec. 4, 1987

Related U.S. Application Data

[60] Continuation of Ser. No. 035,836, Apr. 8, 1987, abandoned, which is a division of Ser. No. 740,360, Jun. 3, 1985, abandoned.

[51] Int. Cl.$^4$ .................. B32B 27/16; B32B 31/02; B32B 31/20
[52] U.S. Cl. .................. 156/229; 156/244.14; 156/244.18; 156/244.21; 156/244.24; 156/273.3; 156/275.5; 156/289; 264/209.3; 264/209.5; 264/230; 264/264; 264/515; 426/127; 426/129
[58] Field of Search ............. 156/229, 244.14, 244.21, 156/244.27, 244.11, 273.3, 275.5, 224.18, 224.24, 94, 95, 289; 264/209.3, 209.5, 22, 514, 515, 230, 264; 426/127, 129

[56] References Cited

U.S. PATENT DOCUMENTS

| 2,891,870 | 6/1959 | Selby et al. |
|---|---|---|
| 3,248,463 | 4/1966 | Wiley et al. .................. 264/209.5 |
| 3,659,000 | 4/1972 | Cronk .................. 156/229 |
| 3,741,253 | 6/1973 | Brax et al. |
| 3,817,821 | 7/1974 | Gallini . |
| 4,064,296 | 12/1977 | Bornstein .................. 428/35 |
| 4,178,401 | 12/1979 | Weinberg et al. |
| 4,239,111 | 12/1980 | Conant et al. |
| 4,247,584 | 1/1981 | Widiger et al. |
| 4,267,960 | 5/1981 | Lind .................. 229/55 |
| 4,399,180 | 8/1983 | Briggs et al. |
| 4,425,268 | 1/1984 | Cooper . |
| 4,456,646 | 6/1984 | Nishimoto et al. |
| 4,457,960 | 7/1984 | Newsome . |
| 4,495,249 | 1/1985 | Ohya et al. |
| 4,532,189 | 6/1985 | Mueller . |
| 4,534,984 | 8/1985 | Kuehne .................. 426/412 |
| 4,547,427 | 10/1985 | Engelsberger . |
| 4,601,930 | 7/1986 | Engelsberger . |

FOREIGN PATENT DOCUMENTS

| 3065379 | 11/1976 | Japan . |
|---|---|---|
| 9095139A | 11/1982 | Japan . |
| 1152450 | 7/1986 | Japan . |
| 2139948A | 11/1984 | United Kingdom . |

Primary Examiner—Merrell C. Cashion, Jr.
Attorney, Agent, or Firm—John J. Toney; William D. Lee, Jr.; Jennifer L. Skord

[57] ABSTRACT

Disclosed is a protective patch for biaxially a heat shrinkable, thermoplastic vacuum bag for protecting the bag from puncture by sharp protruding bones in bone-in cuts of meat which are vacuum packaged within the bags. The patch is made from multi-layer film and preferably comprises outer layers of a blend of linear low density polyethylene and ethylene vinyl acetate copolymer and inner layers of ethylene vinyl acetate copolymer. The patch is heat shrinkable with the bag. A method of making the patch is also disclosed.

6 Claims, 1 Drawing Sheet

U.S. Patent  Sep. 13, 1988  4,770,731
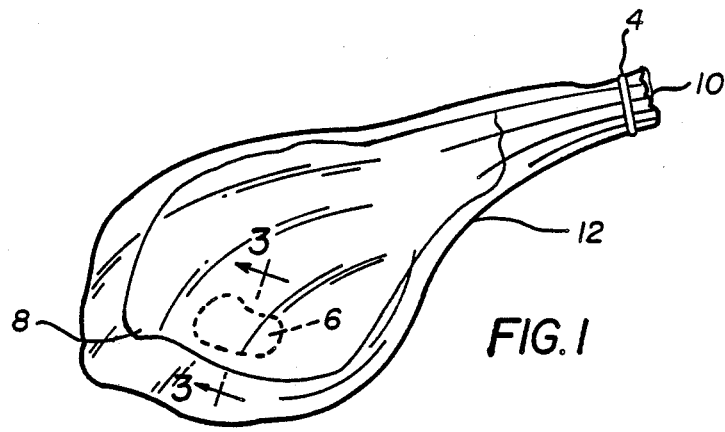
FIG.1
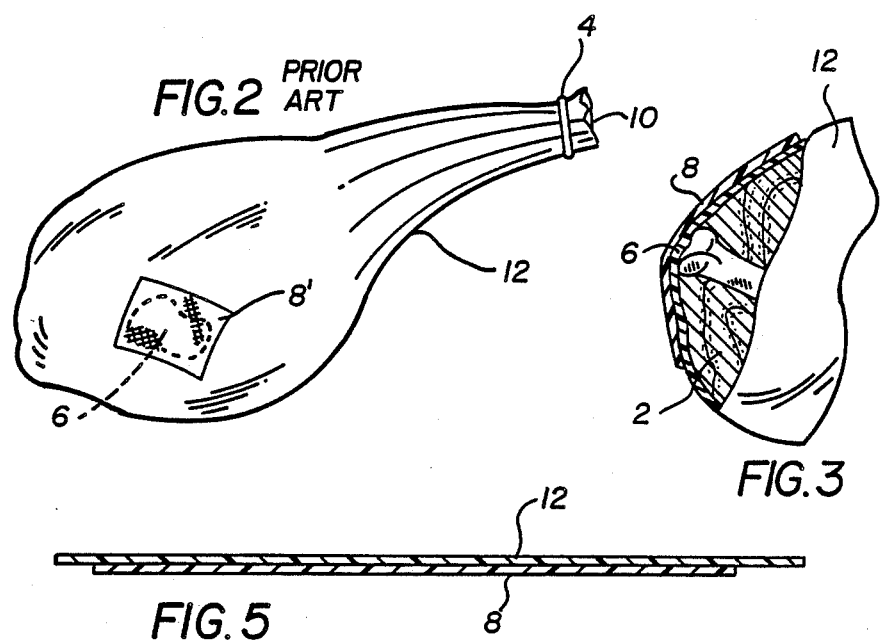
FIG.2 PRIOR ART
FIG.3
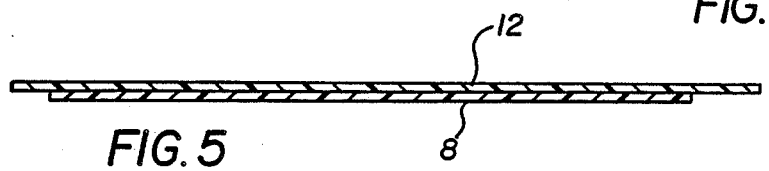
FIG.5
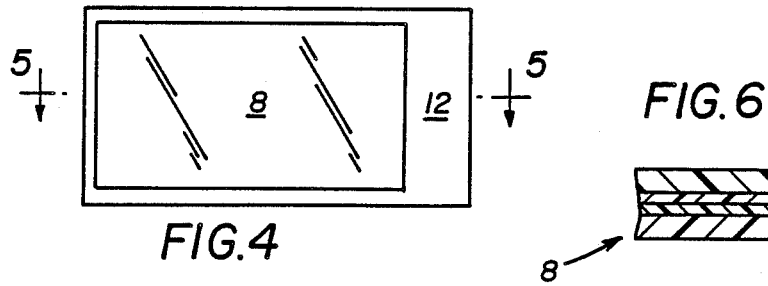
FIG.4  FIG.6

METHOD OF MAKING A PATCH FOR A SHRINKABLE BAG

This is a continuation application of copending application Ser. No. 035,836, filed on Apr. 8, 1987, now abandoned, which is a divisional application of now abandoned application Ser. No. 740,360, filed on June 3, 1985.

FIELD OF THE INVENTION

This invention relates to the packaging of bone-in cuts of meat. In particular, this invention relates to a protective patch which prevents or reduces the likelihood that a bone will completely puncture and rupture a thermoplastic vacuum bag and patch combination.

BACKGROUND OF THE INVENTION

The use of heat shrinkable thermoplastics as flexible packaging materials for vacuum packaging various foodstuffs including meat is well-known. Such plastic materials, however, while in general quite successful for packaging meat understandably have difficulties in successfully packaging sharp or bony products. For example, attempts to package bone-in primal cuts of meat usually result in an unsatisfactorily large number of bag failures due to bone punctures. The use of cushioning materials such as paper, paper laminates, wax impregnated cloth, and various types of plastic inserts have proved to be less than totally satisfactory in solving the problem. The preparation of special cuts of meat or close bone trim with removal of offending bones has also been attempted. However, this is at best only a limited solution to the problem since it does not offer the positive protection necessary for a wide variety of commercial bone-in types of meat. Furthermore, removal of the bone is a relatively expensive and time consuming procedure.

Accordingly, it is one object of the present invention to provide a patch material and method for making the patch which will minimize and eliminate the puncturing of flexible, heat shrinkable vacuum bags by sharp bones.

An example of a prior art method of protecting a thermoplastic bag from puncture is shown in U.S. Pat. No. 2,891,870 which issued on June 23, 1959 to Meyer S. Selby et al. In the Selby patent the exposed bone in a bone-in cut of meat is covered with a wax impregnated cloth and the thus protected meat is placed in a heat shrinkable plastic bag. Accordingly, it is another object of the present invention to eliminate the necessity for having a separate packaging item such as a wax impregnated cloth which must be carefully positioned over the bone and provide a protective patch which will not be as sensitive to or dependent upon the position of the bone within a vacuum bag.

Another object of the present invention is to provide a patch for a thermoplastic vacuum bag which is relatively strong and tough and which can be readily adhered to the outer surface of a thermoplastic vacuum bag.

These and other objects of the present invention will be more readily understood from the summary of the invention, the drawings, and the description of the preferred embodiment which follow:

SUMMARY OF THE INVENTION

In one aspect, the subject invention is a method of making a multi-layer protective patch for a heat shrinkable thermoplastic bag comprising the steps of: coextruding a multi-layer thermoplastic tube, the inner wall of said tube comprising a first ethylene-vinyl acetate copolymer and the outer wall comprising a blend having a major proportion of linear low density polyethylene and a minor amount of second ethylene-vinyl acetate copolymer; applying a sufficient amount of powdered cornstarch or the like to the interior of the tubular extrudate so that upon collapsing, the tube will not self adhere; collapsing the tube; irradiating the collapsed tube to cross-link the materials thereof; opening, heating, and stretching the tube to biaxially orient the tube material; collapsing and flattening the oriented tube whereupon the tube adheres to itself; and cutting the tube into at least one patch.

In another aspect, the present invention is a protective, multi-layer patch for a heat shrinkable vacuum bag comprising: an outer layer comprising a blend of 80% to 100% linear low density polyethylene, 20% to 0% ethylene-vinyl acetate copolymer having a vinyl acetate content in the range of 7% to 12%, and 5% to 0% pigments and additives; an inner layer comprising an ethylene vinyl acetate copolymer having 20% to 35% vinyl acetate content; and, said patch being biaxially heat shrinkable. In a particularly preferred embodiment the patch material has been cross-linked to the equivalent of a dosage level in the range between 4.5 and 13 MR.

DESCRIPTION OF THE DRAWINGS

In the drawings which are appended hereto and made a part of this disclosure,

FIG. 1 is a perspective view of meat enclosed in a heat shrunk bag with the patch of the present invention on the exterior thereof;

FIG. 2 is a perspective view similar to that in FIG. 1, but showing meat with a prior art patch in position, FIG. 3 is a sectional view taken along lines 3—3 of FIG. 1;

FIG. 4 is a fragmentary view showing the patch of the present invention adhered to a thermoplastic vacuum bag;

FIG. 5 is a sectional view along lines 5—5 of FIG. 4; and

FIG. 6 is an exaggerated sectional view of the patch material of the present invention showing a preferred arrangement of the layers.

DETAILED DESCRIPTION

Referring more specifically to the drawings and to FIGS. 1-6, there is provided a bone-in cut of meat 2, for example, a leg of lamb, having exposed bone portion 6. There is also provided patch 8 on bag 12 covering a substantial portion of the visible side of the package. Having the patch on the outside of the bag facilitates the step of loading the bag by eliminating the concern over dislodging a manually laid on cloth patch or a patch adhered to the inside of the bag. Loading can, therefore, take place more readily and easily. After a bone-in cut is loaded into the bag air is evacuated from the package and the bag neck 10 is gathered having the appearance as shown in FIG. 1 and thereafter a clip 4 is applied to securely seal the bag. The bag can then be immersed in hot water and shrunken tightly against the meat thus providing a meat product in an evacuated atmosphere for aging and preservation. The patch 8 shrinks with the bag thus reducing the tendency to delaminate when the patch is not shrinkable in the same manner as the bag.

FIG. 2 shows a prior art bag 12 and covering cloth patch 8' which requires careful positioning of the cloth 8' over the bone 6 and also requires care in positioning the bone within the bag so that the cloth 8' is not pushed out of position or dislodged.

FIG. 3 shows the exposed bone portion 6 covered by bag 12 with the preferred patch 8 adhered to the outside of the bag over the bone protrusion.

In FIG. 4 patch 8 is shown adhered to one side of a wall of bag 12. Preferably patch 8 will cover substantially one side of a bag in its flattened, lay-flat position. In many applications it is desirable to adhere a patch to both sides of a bag.

FIG. 5 is a cross-section view of FIG. 4 showing patch 8 adhered to the one wall of bag 12.

FIG. 6 shows a cross-section, in an exaggerated form, of patch 8 with outer layers 14 and 16 and inner layers 18 and 20. In a preferred embodiment the composition of outer layers 14 and 16 comprises 87% by weight of linear low density polyethylene, 10% by weight of ethylene-vinyl acetate copolymer having 9% vinyl acetate and 3% pigments and additives to aid in extrusion. The preferred linear low density polyethylene is Dowlex 2045 from Dow Chemical Company of Midland, Mich. and the preferred ethylene-vinyl acetate copolymer is ELVAX 3128 from the DuPont Company of Wilmington, Del. The inner layers 18 and 20 comprise ethylene-vinyl acetate copolymer having 28% vinyl acetate from the U.S.I. Division of National Distillers of New York, N.Y. All layers have been cross-linked by irradiation to the dosage level which is equivalent to 7 MR.

In one test bags were made with a 17.5 inches wide and 18 inches long patch of the protective material of the present invention on one side and a 17.5 inch wide and 10 inch long patch on the other. The lay flat dimensions of these bags were 18 inches wide by 30 inches long. In a larger bag (22"×34") for blades a patch of 21.5 inches by 24 inches on one side and a patch of 21.5 inches by 8 inches on the other was used. Various bone-in beef products were put up in bags with both the patch of the present invention as described and with cloth covered bones. The products ranged from rib ends to blades and arms. Of the total of 1173 packages which used cloth to cover the protruding bones there were a total of 55 bone punctures whereas in 2097 packages using the patches of the present invention as described there were only 18 bone punctures.

The embodiment as described above is a preferred one but a satisfactory pouch can be made where the inner and outer layers 14 and 16 comprise 15% ethylene-vinyl acetate copolymer having 9% vinyl acetate and 83.3% linear low density polyethylene with the balance of 1.7% being a pigment. In addition, satisfactory pouches can be made with the outer layers comprising a blend of 90% linear low density polyethylene with 10% vinyl acetate copolymer. Based on experience it is believed that the desirable composition range for the outer layer is 80% to 100% linear low density polyethylene and 20% to 0% ethylene-vinyl acetate copolymer with the vinyl acetate content having a range from 7% to 12% vinyl acetate. The inner layer preferably comprises an ethylene-vinyl acetate copolymer having 20 to 35% vinyl acetate content.

It has been surprisingly found that the increased strength and toughness of the patch according to the present invention is greatly enhanced by the use of linear low density polyethylene. The copolymers referred to as linear low density polyethylene generally have a density of 0.900 to 0.935 grams per cubic centimeter and a crystalline melting point in the range of 110° C. to 125° C. These linear low density polyethylenes are not homopolymers although they are referred to generally as "polyethylene". In fact, they are copolymers of ethylene and an alpha-olefin having a carbon number less than 18, for instance, butene-1, pentene-1, hexene-1, octene-1, etc. In the Dowlex brand of linear low density polyethylene used in the above preferred embodiment it is understood that the alpha-olefin is octene-1. Examples of patents showing the use of such polymers are U.S. Pat. No. 4,425,268 which issued on Jan. 8, 1984 to Barry A. Cooper; U.S. Pat. No. 4,456,646 which issued on June 26, 1984 to Nishimoto et al; U.S. Pat No. 4,399,180 which issued on Aug. 16, 1983 to William F. Briggs et al; and U.S. Pat. No. 4,457,960 which issued on July 3, 1984 to David L. Newsome.

Typical vacuum bags and the vacuum bag of the type used in the test and example set forth above are made according to the process shown in U.S. Pat. No. 3,741,253 which issued on June 26, 1973 to Harri J. Brax et al. The method of the Brax et al patent is incorporated here in by reference and provides background for the description which follows for the method of making the patch of the present invention.

To make the patch of the present invention, a first ethylene-vinyl acetate copolymer having a vinyl-acetate content of approximately 28% by weight is sent to a first extruder. This material forms layers 18 and 20. (FIG. 6). Also, a blend having a major proportion of linear low density polyethylene and a minor proportion of a second ethylene-vinyl acetate copolymer, one having a vinyl acetate content in the range of 7% to 12%, is fed into a second extruder. This material forms layers 14 and 16. Both extruders feed a common coextrusion die of the type which is well-known in the art. The extrudate which issues from the die has an inner wall of the first ethylene-vinyl acetate copolymer and an outer wall of the blend. This type of coextrusion essentially coextrudes two concentric tubes, one inside the other, and in this case the first vinyl acetate copolymer is the inner tube.

As the tube is extruded downwardly it is closed off and flattened by pinch rollers, but in order to keep the first vinyl acetate copolymer from adhering to itself the interior of the tube is coated with an inert dust or powder, preferably powdered cornstarch, in a surface concentration sufficient to prevent self-adherence. This flattened tubing is then fed through an irradiation vault where it will preferably receive a dosage of approximately 7 MR to cross-link the polymeric materials which comprise the tube. The preferred range is 4.5 MR to 13 MR with the most suitable range being between 6 and 8 MR. Chemical cross-linking using an organic peroxide is thought to be an alternate cross-linking method but quite satisfactory results are obtained through use of irradiation cross-linking and irradiation cross-linking is preferred. After receiving the cross-linking dosage the tube is opened, inflated, heated, and stretched by the well-known bubble technique which is described in the above mentioned Brax et al patent. The biaxially stretching orients the tube material. After the material has been stretched to the desired diameter and wall thickness, it is then simultaneously rapidly cooled and collapsed. This process results in a biaxially oriented patch material which is heat shrinkable at approximately the temperature at which it was oriented. When collapsed and flattened the tubing will now tend to adhere to itself as the stretching decreases the concentration of the cornstarch on the inner surface of the bubble or stretched tubing. This concentration of the cornstarch now is low enough to permit self-adherence. The vinyl acetate content of the inner wall is approximately 28% by weight. This is an ethylene-vinyl acetate copolymer in the range where the ethylene-vinyl acetate copolymer acts as an adhesive. Thus, a multi-layer tubular material is produced, in this instance, a four layer material as shown in FIG. 6 is produced. This material can be cut into patches and adhered to one or both sides of the heat shrinkable bag to produce a protective material which will greatly diminish the occurrence of bone punctures.

Many suitable adhesives to adhere the patch to the bag are available and can readily be selected by those skilled in the art, the tendency to delaminate having been greatly reduced as the patch shrinks biaxially as does the bag.

Having thus described my invention, I claim:

1. A method of making a multi-layer protective patch for a biaxially heat shrinkable thermoplastic bag comprising the steps of:
    (a) coextruding a multi-layer, thermoplastic tube, the inner wall of said tube comprising a first ethylene vinyl acetate copolymer and the outer wall comprising a blend having a major proportion of linear low density polyethylene and a minor amount of a second ethylene vinyl acetate copolymer;
    (b) applying a sufficient amount of an inert dust or powder to the interior tube wall so that upon collapsing, the tube will not self adhere;
    (c) collapsing the tube;
    (d) irradiating the collapsed tube to cross-link the materials thereof;
    (e) opening, inflating, heating, and stretching the tube to biaxially orient the tube material;
    (f) simultaneously cooling, collapsing and flattening the tube whereupon the tube adheres to itself; and
    (g) cutting the tube into at least one patch.

2. The method of claim 1 including the additional step of adhering the patch to a surface of the shrinkable thermoplastic bag thereby protecting the bag from puncture.

3. The method of claim 1 wherein the vinyl acetate content of the second copolymer is in the range of 7% to 12% and the vinyl acetate content of the first copolymer is in the range of 20 to 35%, and wherein the blend of linear low density polyethylene and the second ethylene-vinyl acetate copolymer comprises 80% to 100% linear low density polyethylene, 20% to 0% ethylene-vinyl acetate copolymer, and up to 5% pigments and additives.

4. The method of claim 3 wherein the tube is irradiated in the dosage range of from 4.5 to 13.0 MR.

5. A method of making a multi-layer protective patch on a biaxially heat shrinkable thermoplastic bag comprising the steps of:
    (a) coextruding a multi-layer, thermoplastic tube, the inner wall of said tube comprising a first ethylene vinyl acetate copolymer and the outer wall comprising a blend having a major proportion of linear low density polyethylene and a minor amount of a second ethylene vinyl acetate copolymer;
    (b) applying a sufficient amount of an inert dust or powder to the interior tube wall so that upon collapsing, the tube will not self adhere;
    (c) collapsing the tube;
    (d) irradiating the collapsed tube to cross-link the materials thereof;
    (e) opening, inflating, heating, and stretching the tube to biaxially orient the tube material;
    (f) simultaneously cooling, collapsing and flattening the tube whereupon the tube adheres to itself;
    (g) cutting the tube into at least one patch, and
    (h) adhering the patch to a surface of the shrinkable thermoplastic bag thereby protecting the bag from puncture, wherein said patch will, when adhered to said bag, shrink with the bag, thereby reducing the tendency of the patch to delaminate from the bag.

6. The method of claim 5, wherein the vinyl acetate content of the second copolymer is in the range of 7% to 12% and the vinyl acetate content of the first copolymer is in the range of 20 to 35%, and wherein the blend of linear low density polyethylene and the second ethylene-vinyl acetate copolymer comprises 80% to 100% linear low density polyethylene, 20% to 0% ethylene-vinyl acetate copolymer, and up to 5% pigments and additives.

* * * * *